Dec. 17, 1940. E. E. ANDRICK 2,225,251
ANIMAL TRAP
Filed July 26, 1939
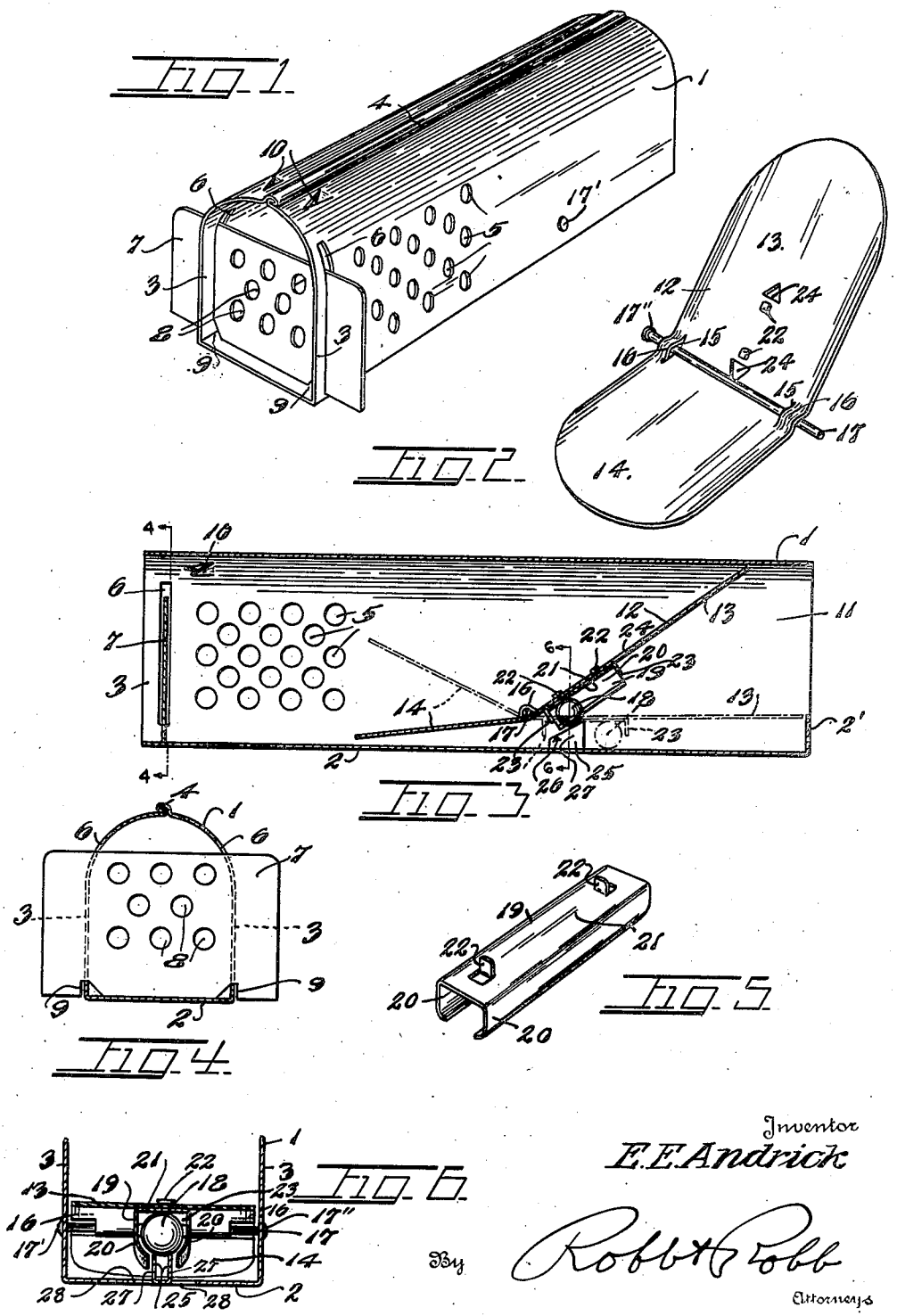

Patented Dec. 17, 1940

2,225,251

UNITED STATES PATENT OFFICE 2,225,251

ANIMAL TRAP

Earnest E. Andrick, Cortland, N. Y.

Application July 26, 1939, Serial No. 286,702

9 Claims. (Cl. 43—61)

This invention appertains to animal traps, and more especially to traps of the type in which a cage or housing is provided with a closure automatically operable by the animal to prevent exit of the animal after entering the cage, thereby causing the animal to be captured alive and uninjured. Such traps are generaly considered more humane than those which may or are intended to cause death or injury to the animal. Also, these traps are particularly advantageous in capturing fur bearing animals without injury or damage of the fur, which may be valuable only when the whole or major part of the pelt is undamaged. The capture of animals for exhibition purposes or for pets is likewise facilitated, and becomes more practical and simple through the use of traps of this class.

One of the primary objects of the present invention is to provide an improved trap construction which can be manufactured in any desired size, according to its intended use, is simple in form and assembly, is composed of relatively few parts, rugged, efficient in operation, and safe as regards the likelihood of injury to both the animal and the person setting or handling the trap.

A further object of the invention is to provide an improved closure for the trap cage, which closure is self-locking and positive in its operation to prevent exit of the animal after entering the cage, while being capable of being reset by a very simple and quick operation.

Another object of the invention is to provide a novel closure for traps of the aforementioned type, which closure is rockably mounted within the housing and carries a member which is movable by gravity from an inoperative position to an operative positive-locking position in relation to a fixed part disposed in the housing, responsive to rocking movement of the closure.

Still another object of the invention is to provide an improved trap which readily lends itself to construction largely from inexpensive materials such as sheet metal, and which requires no welding or soldering operations in its assembly, and is devoid of special fastening means such as rivets, screws and the like.

Other and further objects of the invention will be hereinafter described, and the noval features thereof defined by the appended claims.

In the drawing:

Figure 1 is a perspective view of an animal trap constructed in accordance with my invention;

Figure 2 is an enlarged detail view in perspective of the pivotal member which is normally disposed within the trap cage adjacent to its entrance, and which constitutes a combined closure and treadle;

Figure 3 is a longitudinal vertical sectional view through the trap, illustrating the pivotal closure and treadle member in dotted lines in its set position, permitting entrance of an animal into the trap cage, and in full lines in its tripped and locked position closing the entrance to the cage;

Figure 4 is a transverse vertical sectional view, taken approximately on the plane of the line 4—4 of Figure 3;

Figure 5 is a perspective view of the ball retainer which forms a part of the locking instrumentalities for the closure and treadle member; and Figure 6 is a fragmentary transverse vertical sectional view, taken approximately on the plane of the line 6—6 of Figure 3, with certain of the parts shown in elevation.

Like reference characters designate corresponding parts in the several figures of the drawing, wherein I generally denotes an elongated cage or housing which may be constructed of sheet metal or any other suitable material, and formed to accommodate animals of any desired size, from that of rats, mice, or the like, to that of larger animals such as rabbits, squirrels, fox, etc. As shown, the cage includes a flat bottom 2 from which opposite side walls 3, 3 extend vertically upwardly and thence curve laterally towards each other, with their free extremities interlocked or crimped together, as at 4, with or without welding, soldering, or the aid of separate fastening instrumentalities of any sort. The opposite side walls 3, 3 are preferably perforated, as at 5, near one end to permit the free circulation of air within the cage. Near the same end as the perforations 5, the side walls 3, 3 are each provided with an elongated slot 6 extending vertically upwardly from a point near the bottom 2, and terminating some distance below the top of the cage. The slots 6, 6 are transversely aligned and are adapted to receive therein a flat plate 7, which may be composed of sheet metal, and constitutes a gate at the end of the cage. The gate 7 is also preferably perforated, as at 8, and its lower edge is preferably notched, as at 9, 9, for releasable interlocking engagement with the respective walls 3, 3 at the bottom of the slots 6, 6 (as shown best in Figure 4). When the notches in the gate are interlocked with the walls of the cage, lateral displacement of the gate from the slots 6, 6 is positively prevented. The slots 6, 6 are of sufficient length to enable the gate 7 to be raised vertically far enough to bring the lower edge of the gate to a position slightly above the plane of the bottom of the slots 6, 6, thereby permitting withdrawal of the gate from the slots for affording convenient access to the interior of the cage 1 at the gate end.

Provision is also preferably made for supporting bait within the cage near the gate end, and for this purpose, the cage 1 may be provided with one or more prongs 10, which may be constructed by slitting the cage near its top along intersecting lines, and depressing the triangular shaped portions of the material between the intersecting slits within the cage to form pointed prongs on which the bait may be impaled, as clearly shown in Figures 1 and 3.

The end of the cage 1 opposite to the gate end is open, as at 11, to provide an entrance through which the animal may pass into the cage. Adjacent to the entrance 11, I provide a pivotal member, generally designated 12, which also may be constructed of sheet metal, and which is in the form of a plate bent on a transverse line intermediate its opposite ends to provide a closure forming portion 13 and a treadle forming portion 14 arranged in intersecting planes at an obtuse angle to one another. Near the intersection of the planes of the respective parts 13 and 14, the plate is slit at 15, 15, near its lateral margins, and the material between each slit and the adjacent margin of the plate is offset, as at 16, 16, for tight reception of a transverse pin 17 which is adapted to be journaled at its opposite ends in the side walls 3, 3 of the cage 1, as clearly shown in Figures 1 to 3. The walls 3, 3 are suitably apertured to receive the pin 17, and when the pin has been inserted through the walls and the slits in the intermediate pivotal plate, it may be fixed to prevent withdrawal of the pin in any suitable manner, as by peening the end of the pin 17' opposite to the end on which a head 17'' is provided. It is to be understood, however, that the invention is not limited to the precise details just described, as any other convenient means for rockably supporting the plate member 12 may be resorted to, as preferred.

As clearly shown in the drawing, the horizontal pivotal axis of the plate 12 is arranged somewhat above the bottom 2 of the cage 1, and provision is made for movably supporting a rolling member or ball 18 beneath the closure portion 13 of the plate 12, adjacent to the pivotal axis. As shown in the drawing, the ball 18 is carried by the closure 13 so that it is free to move towards and away from the pivotal axis afforded by the transverse pin 17. As one convenient means for supporting the ball 18, I have shown a ball retainer, generally designated 19, formed of sheet metal and being of generally U-shape in transverse cross section. The laterally spaced walls 20, 20 of the retainer 19 are joined at their upper ends by an intermediate wall 21, which is adapted to be disposed in flat engagement with the lower surface of the closure 13, with the longitudinal axis of the retainer substantially aligned with the center of the closure. The retainer is affixed to the closure by means of spaced tongues 22, 22 struck out of the wall 21 of the retainer and inserted through correspondingly spaced apertures in the closure 13, and bent over upon the upper surface of the closure, as clearly shown in Figure 3. The lower longitudinal edges of the laterally spaced walls 20, 20 of the retainer 19 are curved inwardly so as to prevent the ball from falling out of the retainer through the space between the side walls of the latter, while at the same time affording sufficient clearance between the ball 18 and the ball embracing portions of the retainer to permit the ball to freely roll with a linear movement between the opposite ends of the retainer. To limit the rolling movement of the ball 18 and prevent the same from becoming dislodged from the opposite ends of the retainer 19, a pair of abutments 23 are struck out of the closure 13 and depressed therefrom so as to project downwardly therefrom across the opposite open ends of the retainer, the abutments being preferably triangular in shape, corresponding to the shape of the openings 24, 24 in the closure 13, as shown in Figure 2. Instead of constructing the retainer 19 as a separate element, it may be formed as an integral part of the closure 13, as by suitably striking out and depressing portions of the material of the closure 13 to form walls corresponding to the retainer walls 20, 20, as will be obvious.

Disposed beneath the closure 13 and adjacent to the pivotal axis of the plate 12, there is provided one or more fixed abutments 25 carried by the bottom 2 of the cage 1, and having an upper inclined surface 26 arranged for contact with the ball 18 when the latter is moved to a position near the pivotal axis of the plate 12. For convenience, the fixed abutment means 25 may be formed as an integral part of the bottom 2 of the casing 1, as shown in Figure 6, in which the abutment means is illustrated as a pair of vertically disposed laterally spaced webs 27, 27 which are struck out of the openings 28, 28 in the bottom 2. The webs 27, 27 are arranged sufficiently close together so that they may be received between the side walls 20, 20 of the ball retainer 19, without interfering with the rocking movement of the plate 12. The upper edge of each web 27 is inclined, as shown at 26 in Figure 3. If preferred, the abutment means may be constructed separately and attached to the bottom 2 of the casing 1, as will be obvious.

In the use of the trap, the same is set by moving the ball 18 in the retainer 19 towards the end of the latter which is farthest from the pivotal axis of the plate 12, and then rocking the plate 12 so as to dispose the closure portion 13 in a substantially horizontal position, with the ball lying intermediate the closure 13 and the bottom 2 of the casing 1, at the end of the abutment means 25, as shown by the broken lines in Figure 3. In this position of the closure part 13, further downward movement of the closure 13 is prevented by engagement of the highest point of the fixed abutment means 25 with the lower surface of the wall 21 of the ball container 19 and/or by engagement of the ball 18 with the bottom 2. Thus the closure part 13 will be maintained substantially level and rigid, while the treadle part 14 is disposed in an upwardly inclined position as shown by the broken lines in Figure 3. If desired, the bottom 2 of the cage may be provided with an upright extension 2' at the entrance 11 of the cage, with the upper extremity of the extension 2' terminating approximately on a level with the closure member 13 when the latter is in its depressed substantially horizontal position, thereby preventing anything from accidentally getting under the closure. With the plate 12 set in the position just described, the entrance 11 of the cage 1 is open to permit the entrance of an animal into the same, which the animal is encouraged to do by previously placing a suitable bait upon the bait supporting prongs 10 when the trap is set. As the animal advances into the cage over the closure part 13 and continues on to the treadle part 14 of the plate 12, the weight of the animal upon the treadle part 14 acts to overbalance the plate and rock it in a counter-clockwise direction, as viewed in Figure 3, thereby depressing the treadle part 14 and elevating the closure part 13 behind the animal to an upwardly inclined position as shown in this figure. As the closure part 13 is elevated, the ball retainer 19 is correspondingly raised, due to its attachment thereto, and assumes an inclined position, causing the ball 18 to roll by gravity in the retainer towards the pivotal axis of the plate 12, bringing the ball into a position intermediate the closure 13 and the upper inclined face of the fixed abutment means 25. The angle of inclination of the upper surface of the fixed abutment means is preferably such that it is approximately parallel to the closure portion 13 of the plate 12 when the latter assumes its entrance closing position represented by the full lines in Figure 3. The ball 18 thereby automatically becomes firmly wedged between the closure member 13 and the abutment means 25, and will not become accidentally dislodged from its wedging position to release the closure 13 and permit escape of the animal which has become trapped within the cage 1, no matter how much pressure is exerted by the animal upon the closure 13 in attempting to escape through the end of the cage into which it previously entered. When an animal has been trapped, it may be conveniently removed from the cage by withdrawing the gate 7 in the manner previously described, after which the trap may be rebaited, if necessary, and reset following replacement of the gate 7 to its position shown in Figures 1 and 4. It will be perfectly clear from the foregoing that the operation of the trap as hereinbefore described precludes any likelihood of injury to the animal, as well as any injury to the user of the trap in baiting and setting the same. Setting of the trap can be quickly accomplished by inverting the trap and simultaneously tilting the same so that the ball will roll to the end of the retainer 19 which is farthest from the pin 17, and then restoring the trap to its generally upright position while still tilted, to allow the closure member 13 to fall to the broken line position shown in Figure 3. Due to the weight of the ball retainer 19 and/or the ball 18, the plate 12 is normally overbalanced so that it tends to move in a counter-clockwise direction as viewed in Figure 3, and this tendency may be further aided by the arrangement of the transverse pin 17 closer to the free end of the treadle part 14 than to the free end of the closure part 13, as shown in the drawing. This arrangement makes is unnecessary to place the trap upon the ground or any other surface in any predetermined position, and enables its position to be varied at will from horizontal to a substantial inclination, without affecting the efficient operation of the trap.

While the specific details have been herein shown and described, the invention is not confined thereto, as changes and alterations may be made without departing from the spirit thereof as defined by the appended claims.

Having thus described my invention, what I claim as new and desire to secure by Letters Patent is:

1. A trap comprising a cage having an entrance, a closure movably mounted within the cage adjacent to the entrance for movement to and from a position closing the entrance, and means for positively restraining said closure from movement when in its entrance closing position, said last named means including a fixed abutment on the cage and a movable member carried by the closure and shiftable from an inoperative position to an operative abutment engaging position responsive to movement of the closure to its entrance closing position.

2. A trap comprising a cage having an entrance, a closure movably mounted within the cage adjacent to the entrance for movement to and from a position closing the entrance, and means for positively restraining said closure from movement when in its entrance closing position, said last named means including a fixed abutment on the cage and a gravity operated member carried by the closure and shiftable from an inoperative position to an operative abutment engaging position responsive to movement of the closure to its entrance closing position.

3. A trap comprising a cage having an entrance, a closure movably mounted within the cage adjacent to the entrance for movement to and from a position closing the entrance, and means for positively restraining said closure from movement when in its entrance closing position, said last named means including a fixed abutment on the cage and a rolling member carried by the closure and shiftable from an inoperative position to an operative abutment engaging position responsive to movement of the closure to its entrance closing position.

4. A trap comprising a cage having an entrance, a closure pivotally mounted within the cage adjacent to the entrance for swinging movement to and from a position closing the entrance, and means for positively restraining said closure from movement when in its entrance closing position, said last named means comprising a movable member interposed between the closure and the cage and shiftable from an inoperative position to an operative position responsive to movement of the closure to its entrance closing position.

5. A trap comprising a cage having an entrance, a closure pivotally mounted within the cage adjacent to the entrance for swinging movement to and from a position closing the entrance, and means for positively restraining said closure from movement when in its entrance closing position, said last named means comprising a movable wedging member interposed between the closure and the cage adjacent to the pivotal axis of the closure and shiftable from an inoperative position to an operative wedging position between the closure and cage responsive to movement of the closure to its entrance closing position.

6. A trap comprising a cage having an entrance, a closure pivotally mounted within the cage adjacent to the entrance for swinging movement to and from a position closing the entrance, and means for positively restraining said closure from movement when in its entrance closing position, said last named means comprising a ball, a retainer carried by the closure and in which the ball is loosely retained for permitting free linear movement of the ball responsive to swinging movement of the closure, and means on the cage for engaging the ball and preventing movement of the ball and closure when the closure is swung to its entrance closing position.

7. A trap comprising a cage having an entrance, a closure pivotally mounted within the cage adjacent to the entrance for swinging movement to and from a position closing the entrance, and means for positively restraining said closure from movement when in its entrance closing position, said last named means comprising a ball, a retainer carried by the closure and in which the ball is loosely retained for permitting free linear movement of the ball responsive to swinging movement of the closure, and abutment means on the cage having an inclined surface for engaging the ball and preventing movement of the ball and closure when the closure is swung to its entrance closing position.

8. A trap comprising a cage of elongated form including laterally spaced intersecting side walls forming an entrance at one end, a member pivotally mounted within the cage adjacent to the entrance for swinging movement in a vertical plane, said member including a pair of plate-like parts arranged in intersecting planes at an obtuse angle to one another at opposite sides of the pivotal axis of the member, with one of said parts disposed for swinging movement from a substantial horizontal position near the bottom of the cage to an upwardly inclined entrance closing position, and the other of said parts correspondingly disposed for swinging movement from an upwardly inclined position within the cage to a depressed position responsive to the imposition of the weight of an animal thereon when the animal advances into the cage through the entrance, means automatically operable by the swinging movement of the member for restraining said member from movement when the entrance of the cage is closed by the part of the member as aforesaid, the side walls of the cage being provided with transversely aligned vertical slots adjacent to their ends opposite to the entrance forming ends thereof, and a vertically disposed gate member extended through the slots and having notches in its lower edge for releasable engagement with the side walls of the cage at the bottom of the respective slots.

9. A trap comprising a cage having an entrance, a member pivotally mounted within the cage adjacent to the entrance for swinging movement in a vertical plane, said member including a pair of plate-like parts arranged in intersecting planes at an obtuse angle to one another at opposite sides of the pivotal axis of the member, with one of said parts disposed for swinging movement from a substantially horizontal position near the bottom of the cage to an upwardly inclined entrance closing position, and the other of said parts correspondingly disposed for swinging movement from an upwardly inclined position within the cage to a depressed position responsive to the imposition of the weight of an animal thereon when the animal advances into the cage through the entrance, and means automatically operable by the swinging movement of the member for restraining said member from movement when the entrance of the cage is closed by the part of the member as aforesaid, said restraining means comprising a shiftable wedging member carried by the pivotal entrance closing part and normally disposed at a distance from the pivotal axis of the entrance closing part, while being free to move into wedging relation between the entrance closing part and the cage, near the pivotal axis aforesaid.

EARNEST E. ANDRICK.